United States Patent [19]
Lovich et al.

[11] 3,860,138
[45] Jan. 14, 1975

[54] CARGO CONTAINER LATCH AND DOOR

[75] Inventors: John W. Lovich; Oscar W. Meller; Frank C. Morse, all of Akron, Ohio

[73] Assignee: Goodyear Aerospace Corporation, Akron, Ohio

[22] Filed: Jan. 4, 1974

[21] Appl. No.: 430,803

[52] U.S. Cl.................... 220/1.5, 220/29, 220/38, 220/41, 160/118, 49/197
[51] Int. Cl.......................................... B65d 87/00
[58] Field of Search ................ 220/1.5, 29, 38, 41; 49/197, 201; 292/281; 312/215, 286; 160/113, 117, 118; 16/179

[56] References Cited
UNITED STATES PATENTS
3,672,529  6/1972  Feddersen et al. .................. 220/1.5
3,706,392  12/1972  Sprick et al...................... 220/1.5 X Primary Examiner—George T. Hall
Attorney, Agent, or Firm—Oldham & Oldham

[57] ABSTRACT

The invention relates to cargo containers and more particularly, to door and latch assemblies therefore. The invention comprises a dutch door having separate and independent upper and lower door portions interconnected by a unique latch-hinge assembly. The latch-hinge assembly allows the upper door to be disengaged from the lower door, rotated about an upper hinge, and be stored atop the cargo container on a slide thereon which engages with a track extruded in the upper door. The upper and lower doors may, as a unit, be opened by the folding of the lower door onto the upper door about the latch-hinge assembly and a subsequent storage of the two doors atop the cargo container may then be achieved by means of the slide-track engagement.

10 Claims, 8 Drawing Figures

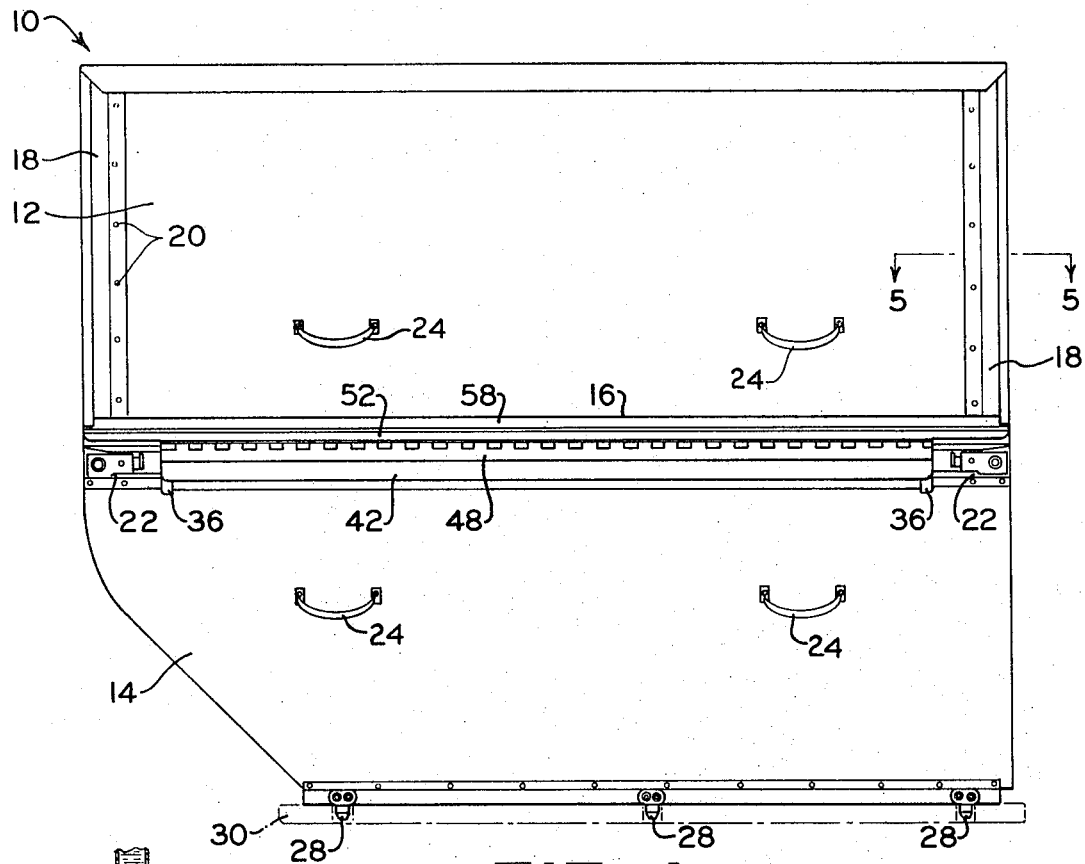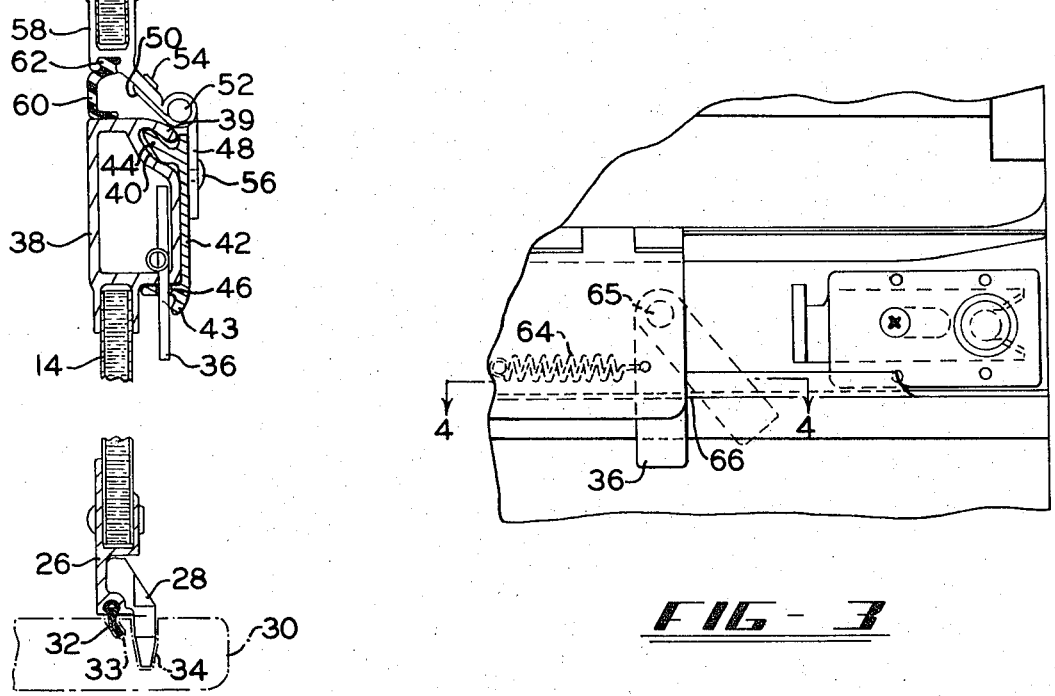

CARGO CONTAINER LATCH AND DOOR

BACKGROUND OF THE INVENTION

Heretofore various types of cargo containers have been known and utilized in the transportation industry. In general, these cargo containers have utilized single-piece doors which, when opened, totally expose the entire interior of the cargo container. It has become apparent that it is often times desirable that access may be made to the interior of the cargo container while retaining an entire vertical enclosure about the base of the container. By retaining a complete vertical enclosure, a bulk loading of the cargo container may be most readily accomplished.

Consequently, it is an object of the instant invention to present a cargo container latch and door assembly which may operate basically as a dutch door.

A further object of the invention is to present a cargo container latch and door assembly which may be readily stored atop the cargo container.

Yet another object of the invention is to present a cargo container door assembly which basically comprises two doors which may be folded onto each other and storingly placed atop the cargo container.

Still a further object of the invention is to present a cargo container door and latch assembly which may be easily handled by a single individual and which is weather tight, sturdy, and inexpensive to construct.

These objects and other objects which will become apparent as the detailed description proceeds are achieved by a cargo container latch and door assembly for sealing the front framework of a cargo container, comprising:

an upper door having edge members along the verticle edges thereof, the edge members having tracks therein, the upper door hingedly connected to the framework;

a lower door having latches at the sides thereof to affectuate latching engagement with the framework; and a lateral hinge and latch assembly transversing the widths of the upper and lower doors and interconnecting said doors, a first portion of the assembly being connected to the upper door and a second portion of the assembly being connected to the lower door.

For a complete appreciation of the structure of the invention and the method of utilizing the same, reference should be had to the following detailed description and accompanying drawings wherein:

FIG. 1 is a front plane view of the cargo container door and latch assembly according to the teachings of the invention;

FIG. 2 is a broken side view of the door and latch assembly;

FIG. 3 is a cut-away view of the locking tab of the latch assembly;

Figure 4:
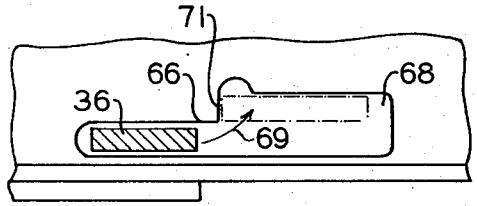
FIG. 4 is a view of the locking tab of FIG. 3 taken along the line 4—4.

Referring now to the drawings and more particularly FIG. 1, a basic appreciation of the structure of the door assembly 10 may be had. It can be seen that the door assembly 10 basically comprises an upper door 12 and a lower door 14 thus creating a dutch-type door. A lateral hinge and latch assembly 16, which will be described in detail hereinafter, interconnects the doors 12 and 14. As will further be described, vertical extruded edge members 18 are appropriately attached at points 20 to the upper door assembly 12. Slide latches 22, as are thoroughly described in U.S. Pat. No. 3,752,520 assigned to Goodyear Aerospace Corporation of Akron, ohio, are affixedly attached to the lower door 14 and make slide latching engagement with the framework of the cargo container to which the door assembly 10 is attached. The operation and latching of the slide latches 22 is thoroughly described in the above-mentioned patent and hence will not be elaborated on herein. Fabric handles 24 are fixedly attached to the doors 12 and 14 as shown and, as will be presented hereinafter, provide means whereby an operator may maneuver the doors 12 and 14 separately or as a unit. An extruded edge member 26 is fixedly attached along the bottom of the door 14 and has attached thereto shear blades 28 for resisting forces imparted to the inside of the door from shifting cargo contained within the container. Shear blades 28 are received within appropriate grooves 34 within the base 30 of the container as is most appropriately shown in FIG. 2.

It is preferred, though not required, that the doors 12 and 14 of the invention be of an aluminum-clad balsa wood construction as is shown in FIG. 2. Such construction is well known and understood to those skilled in the art and generally requires the provision of extruded edge members such as the member 26 attached along the edges thereof. As can be seen, the shear blades 28 are directly attached to or extruded from the bottom edge member 26. Further received within the member 26 is a rubber seal 32 which is sealingly received within the lateral groove 33 of the base 30. It should be particularly noted that the seal 32 and groove 33 are angled with respect to the surface of the base 30 so as to provide a weather tight seal thereat when the door assembly 10 is maneuvered into its closed position as will be discussed hereinafter.

The top edge of the door 14 has fixedly attached thereto an aluminum channel member 38 along the entire top edge thereof. As can be seen, the channel member 38 has an overhanging lip 39 which recesses into a cavity 40. Operatively positioned adjacent the channel member 38 and the cavity 40 thereof is a locking bar 42 having a locking tongue 44 at one end thereof. The locking tongue 44 is particularly designed so as to achieve a gripping engagement with the cavity 40 by making contact therewith at the points 41, 43. When in locking position, the locking bar 42 lies flushly adjacent the channel member 38 and the lip 39.

As can be further seen in FIG. 2, the locking bar 42 has attached thereto by means of the bolts 56 a lower hinge plate 48 which is operatively connected to an upper hinge plate 50 my means of the hinge pin 52. Bolts 54 connect the plate 50 to the extruded aluminum member 58 which is fixedly attached to the lateral bottom edge of the top door 12. A rubber seal 60 is connected to the extruded member 58 by the tongue and groove engagement at 62. The rubber seal 60 makes sealing engagement with the channel member 58 of the lower door 14 so as to create a weather tight seal between the two doors.

As can be seen from FIGS. 1 – 3, at each end of the lateral hinge and latch assembly 16 there is a tab 36 which is connected by means of a spring 64 to the channel member 38. The tabs 36 are normally held by the springs 64 in engagement with the locking slots 64 in the ends of the locking bar 42. With the tabs 36 within the locking slots 46, movement of the locking bar 42 and the consequent engagement of the locking tongue 44 with the cavity 40 is inhibited. With the tab 36 and locking slot 46 so engaged, the doors 12 and 14 present a single operative unit fixedly held together by the interlocking engagement of the tongue 44 and the cavity 40. The angled contact of the tongue 44 with the points 41, 43 and the lip 39 present means for receiving and transmitting both horizontal and vertical forces imparted to the latch engagement. It should be noted that although the tab and slot engagement 36, 46 is only present at the ends of the lateral hinge and latch assembly 16, the angled engagement of the locking tongue 44 with the channel member 38 extends the entire width of the assembly 16.

Separable operation of the doors 12 and 14 is instituted by displacement of the tabs 36 about their respective pivotal pins 65 so as to disengage the tabs 36 from the locking slots 46 of the locking bar 42. As is best shown in FIG. 4, as the tabs 36 are pivoted around the pin 65 they are moved through slot 66 in the channel member 38. When disengaged from the locking slot 46, they may be passed in the direction of the arrow 69 and into the recess 68 in the channel member 38 and then held against the lip 71 by means of the spring 64. Thus, once the tabs have been rotated into the recesses 68 they are retained there by the spring forced engagement against the edge 71 until "popped-out" by the fingers of the operator so as to again cause locking engagement between the bar 42 and the channel 38.

With the tabs 36 disengaged from the slots 46, an operator may grip the locking bar 42 with his fingers at the curved end 43 thereof and, by pivoting the locking bar 42 and lower hinge plate 48 about the hinge pin 52, rock the locking tongue 44 out of gripping engagement with the cavity 40. The lower door 14 is held into sealing engagement along the frame of the cargo container by means of the latch assemblies 22. The upper door 12 however is now freed from engagement with the door 14 and may now be opened independent of the lower door 12.

Figure 5:
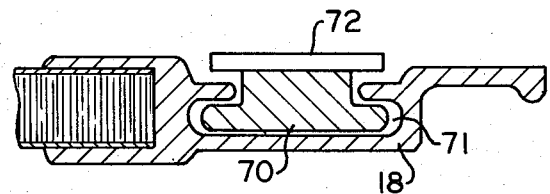
FIG. 5 is a cross sectional view of the extruded end portion of the door assembly taken along the line 5—5 of FIG. 1.
Figure 6:
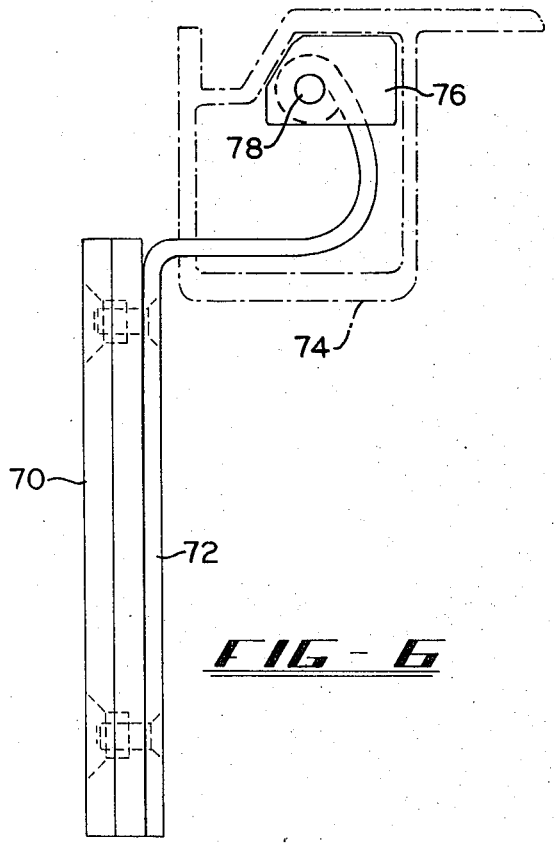
FIG. 6 is an illustrative embodiment of the upper hinge and slide assembly of the invention.
Figure 7A:
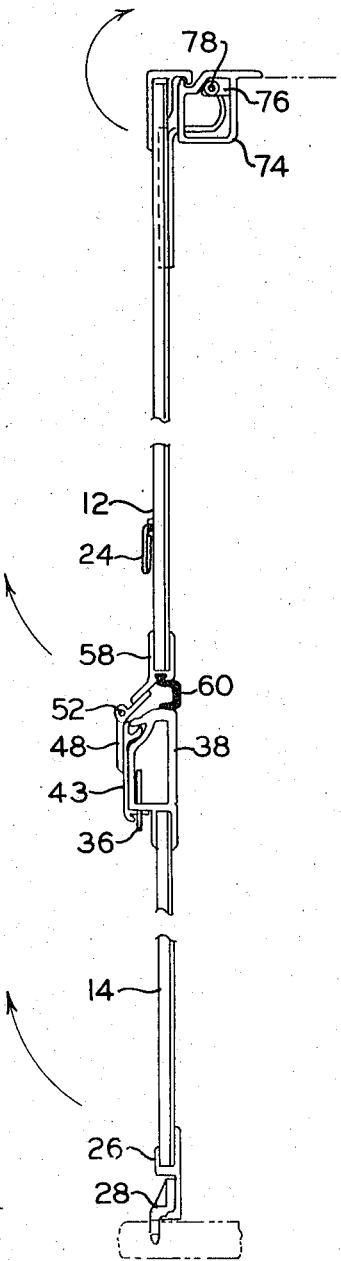
FIGS. 7a and 7b present a side view of the door assembly showing the storage thereof atop the cargo container.
Figure 7B:
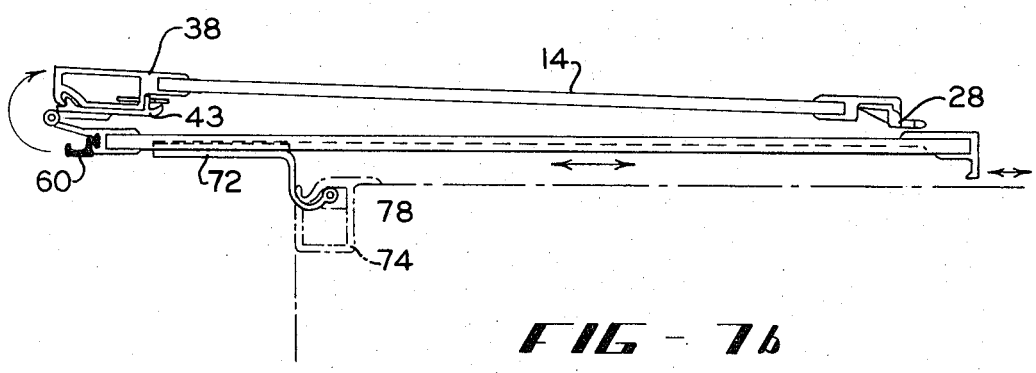

Unique arrangements have been made in accordance with the instant invention whereby the upper door 12 may be separately stored atop the cargo container. With reference to FIG. 5, it can be seen that the extruded edge members 18 along the edge portions of the upper door 12 are characterized by the presence of a track 71 provided therein. The track 71 is of such a nature as to engage with a slide placed in aligned relationship with the track 71 on top the cargo container at each end thereof. As can be seen in FIGS. 6, 7a, and 7b, the upper door 12 is fixedly attached to a hinge plate 72 which is pivotally connected about a hinge pin 78 mounted in a bracket 76 contained within the cargo container header channel 74. As can be seen in FIG. 5, the hinge plate 72 is fixedly attached to a slide 70 which makes sliding engagement with the track 71 of the extruded edge member 18. The track 70 and hinge plate 72 extend about 20% of the distance down the upper door 12 so as to provide a proper support therefore and present a portion of the slide 70 in engagement with the track 71 so as to effectuate alignment with the track atop the cargo container. With the door 12 disengaged from the door 14, the door 12 may be rotated on the hinge 72 about the pin 78 to a point such that the door 12 is substantially parallel to the top of the cargo container. At this point, the slides 70, attached to the hinge plates 72, abut in alignment with the slides atop the cargo container such that the door 12 may be slid along the tracks 71 upon the slides 70 and the slides atop the cargo container. The door 12 may then be stored atop the cargo container on the slids such that protrusion beyond the front of the cargo container of the stored door is substantially equivalent to the length of the hinge plate 72 as shown in FIG. 7a. It can be seen then that the door 12 is a low profile door in that the storage atop the container does not require the door 12 to ever pass more than a nominal distance above the top of the cargo container. Consequently, cargo containers utilizing the door of the instant invention may be used in areas having low ceilings.

It should be noted that preferably the extruded edge members 18 are of aluminum and the slide 70 is of a nylon, teflon, or other synthetic material highly impervious to the affects of the elements.

It is of course a unique attribute of the instant invention that the doors 12 and 14 may be opened as a single unit as well as separate and independently as described directly above. To open the entire door, comprising the doors 12 and 14, the tabs 36 are retained in the slots 46 so that operative engagement of a latch assembly 16 is maintained. The latches 22 are disengaged from their respective latching slots within the vertical edge members of the cargo container so as to disengage the entire door assembly 12, 14 from the sides of the container. With the latches 22 so disengaged, an operator may pull on one of the upper handles 24 in a direction outward from the drawing of FIG. 1, so that the door assemblies 12, 14 will pivot about the continuous hinge pin 52. The bottom of the lower door 14 is consequently angled with respect to the base 30 such that the rubber seal 32 rocks out of the groove 33 with which it was sealingly engaged. When the rubber seal 32 is so disengaged and the shear pins 28 are similarly disengaged, the lower door 14 may then be rotated about the hinge pin 52 so as to be folded atop and flush with the upper door 12. The doors 12 and 14 are then presented in a single unit of substantially twice the thickness of a single door 12 or 14. At this point, the same technique as described hereinabove is utilized in placing the entire unit of doors 12 and 14 atop the cargo container. Basically, the doors 12 and 14 are rotated on the hinge plate 72 about the pin 78 to a point substantially in alignment with the top of the cargo container; at which point the doors 12, 14 are slid along the slides 70 on the tracks 71 into stored position atop the cargo container as shown in FIG. 7b.

The sealing of the doors 12 and 14 is accomplished in substantially the reverse order of the storing thereof. It should be appreciated that the rubber seal 32 is locked into sealing engagement with the grooves 33 when the doors 12 and 14 are pushed into sealing alignment with each other so that the latches 22 may be actuated. The angled seal 32 provides a most effective weather tight seal.

While in accordance with the Patent Statutes only the preferred embodiment and best mode of the invention contemplated by the inventor have been presented and described in detail, it is to be understood that the invention is not limited thereto or thereby. Consequently, for a true appreciation of the scope and breadth of the invention reference should be had to the appended claims.

What is claimed is:

1. A cargo container door and latch assembly for sealing the front framework of a cargo container having a top, a base, vertical door frame elements interconnecting the top and base, and a header attached to the top and interconnecting the door frame elements, comprising:
   a top door;
   a hinge connecting the top door to the header;
   a bottom door;
   a latch-hinge assembly interconnecting the top and bottom doors, the latch-hinge assembly adaptable to fixedly interengage the top and bottom doors in one instance, separately release the doors in another instance, and allow rotational movement of one door with respect to the other in a third instance; and
   a latch attached to the bottom door operative to fixedly engage the bottom door to the container framework.

2. The door and latch assembly as recited in claim 1 wherein the top door has edge members along the vertical side edges thereof, the edge members having tracks extruded therein.

3. The door and latch assembly as recited in claim 2 wherein two hinges are connected to the header, the hinges having slides connected thereto in sliding engagement with the tracks, the hinge being rotatable about the header through an arc of 90° so that the slides may align with the top of the cargo container.

4. The cargo container as recited in claim 1 wherein the hinge-latch assembly comprises:
   a channel member fixedly attached to the top edge of the bottom door, the channel member having a protruding lip overhanging downwardly toward the bottom door, the lip recessing into a cavity;
   a lateral hinge connected to the bottom edge of the top door;
   a locking bar connected to the lateral hinge, the locking bar having a locking tongue protruding therefrom, the locking tongue being complementary to the cavity and adaptable to lockingly engage with the cavity such that the tongue engages the cavity at two points and the locking bar engages the protruding lip.

5. The cargo container as recited in claim 4 wherein the locking bar transverses the entire width of the bottom door and wherein the locking bar has slots of each end thereof, the slots engageable with tabs pivotally mounted to the channel member, such engagement fixedly retaining the locking bar and tongue in engagement with the recess and lip.

6. The cargo container as recited in claim 1 wherein the bottom has a plurality of shear blades attached thereto and a seal element protrudes from the bottom edge of the bottom door at an angle toward the outside of the door, and wherein the upper door has attached to the bottom edge thereof a flexible seal element operative to engage the bottom door in sealing relationship.

7. A cargo container latch and door assembly for sealing the front framework of a cargo container, comprising:
   an upper door having edge members along the vertical edges thereof, the edge members having tracks therein, the upper door hingedly connected to the framework;
   a lower door having latches at the sides thereof to affectuate latching engagement with the framework; and
   a lateral hinge and latch assembly transversing the widths of the upper and lower doors and interconnecting said doors, a first portion of the assembly being connected to the upper door and a second portion of the assembly being connected to the lower door.

8. The latch and door assembly as recited in claim 7 wherein hinges connect the upper door to the framework, the hinges having slides connected thereto, the slides engaging the tracks on the edge members of the upper door in fixed sliding relationship therewith.

9. The cargo container as recited in claim 7 wherein the lateral hinge and latch assembly comprises:
   a lateral edge member fixedly attached to the lower door and having a protruding element extending therefrom and overhanging a recess contained therein;
   a hinge element fixedly attached to the lower edge of the upper door;
   a locking element secured to the hinge and rotatable thereby, the locking element having a tongue extending therefrom, the tongue being complementary to the recess and operative to engage therewith; and
   securing means affixed to the lower door for engagement with the locking element to retain the locking element in a fixed position.

10. The cargo container as recited in claim 9 wherein the locking element has slots at each end thereof and wherein the securing means comprise tabs pivotally mounted upon the lower door, the tabs operatively engaging the slots.

* * * * *